Aug. 15, 1933.  A. L. WOOTEN  1,922,118
APPARATUS FOR DELINTING AND SOFTENING COTTON SEED
Filed Nov. 19, 1931   2 Sheets-Sheet 1
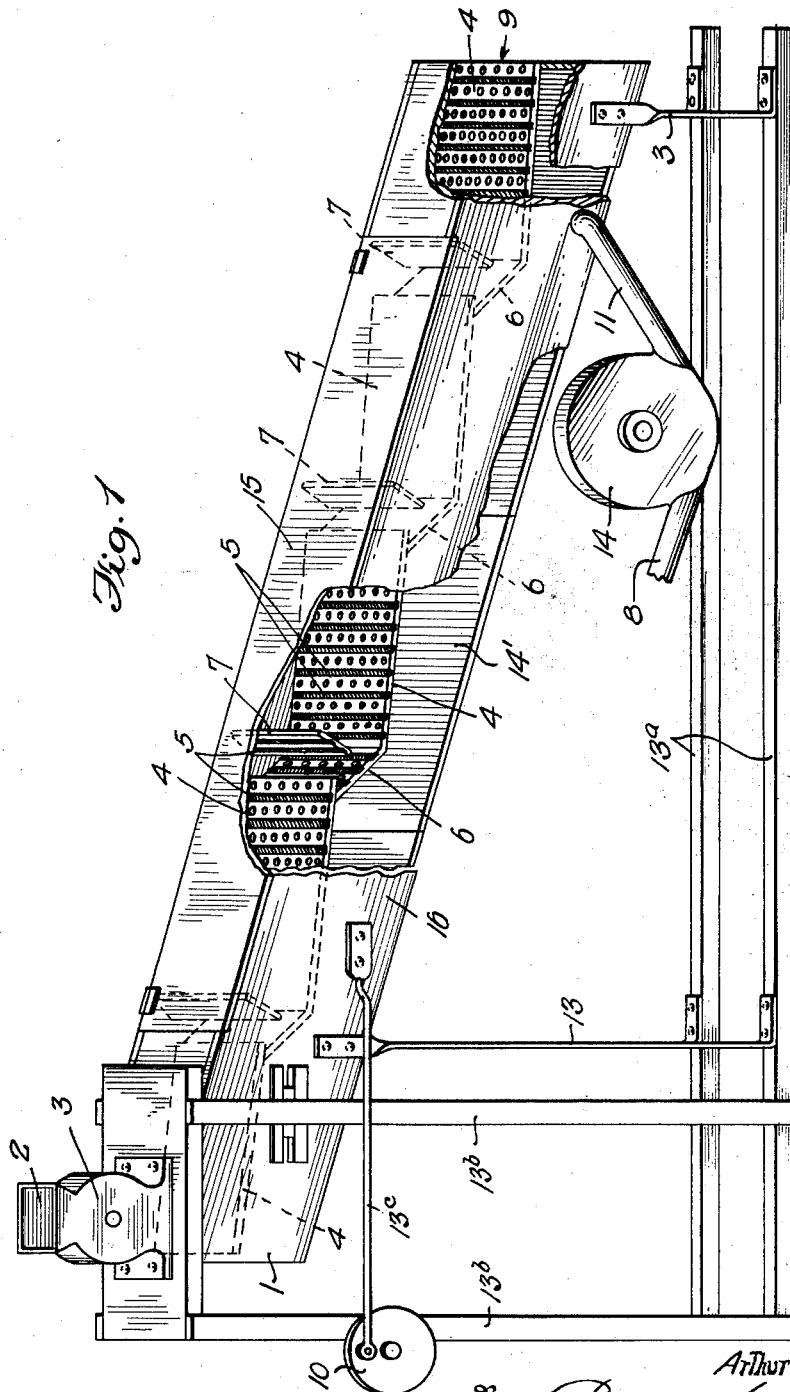
Inventor
Arthur L. Wooten
By [signature]
Attorney Aug. 15, 1933.　　　A. L. WOOTEN　　　1,922,118
APPARATUS FOR DELINTING AND SOFTENING COTTON SEED
Filed Nov. 19, 1931　　2 Sheets-Sheet 2
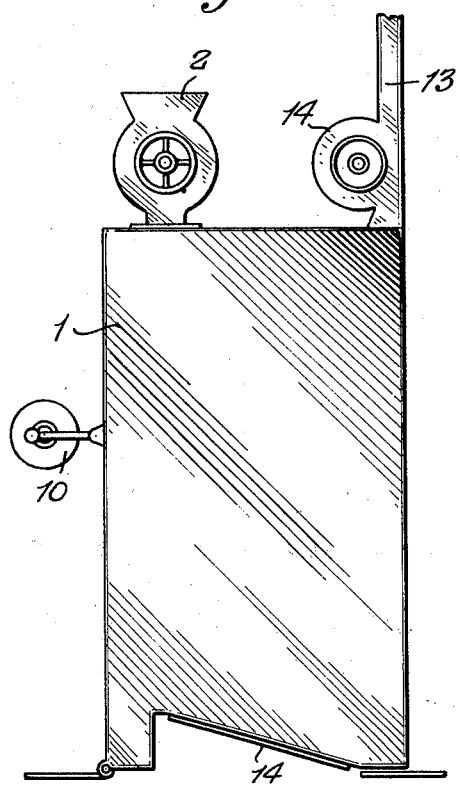
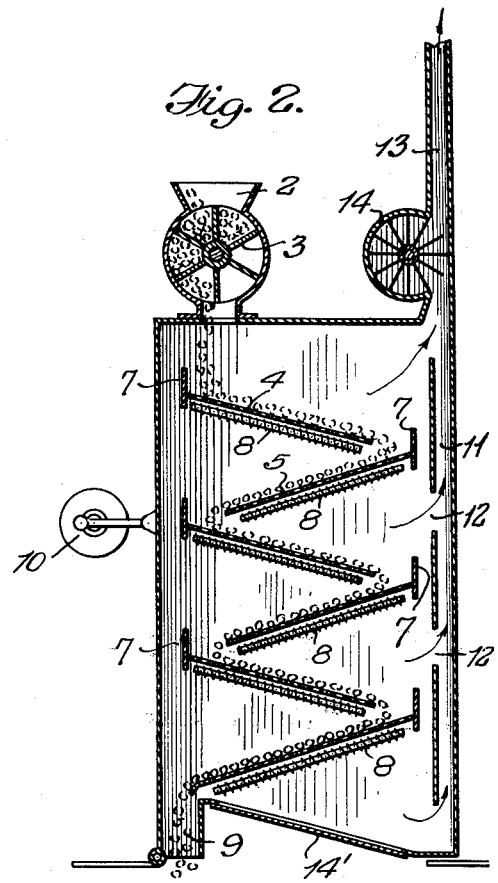
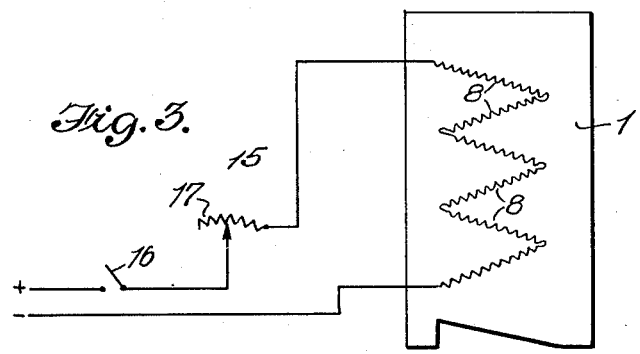
Inventor
Arthur L. Wooten.

Patented Aug. 15, 1933

1,922,118

UNITED STATES PATENT OFFICE 1,922,118

APPARATUS FOR DELINTING AND SOFTENING COTTON SEED

Arthur L. Wooten, Little Rock, Ark.

Application November 19, 1931
Serial No. 576,187

2 Claims. (Cl. 83—28)

This invention relates to an apparatus for delinting and heat softening cotton seed, to place the seed in a most effective condition for treatment in the production of cotton seed oil and cotton seed meal, cotton seed hulls and hull bran.

It is necessary to clean cotton seed to be used for the production of oil before they are crushed, in order to free them from all materials or substances which are liable to reduce the yield of oil or to impair its quality. This has heretofore been done mechanically, or solely by the action of whippers or beaters which is objectionable because of the excessively high cost of removing the last few pounds per ton when accomplished by this mechanical process; or the seed have been subjected to the action of chemicals or a heating flame, alone, or in combination, for the purpose of burning off or rendering the lint fibres, or other impurities adhering to the seed, crisp and brittle, for removal by agitation, which is objectionable because of the liability of physically damaging the seed or scorching, charring or unduly cooking the seed and rendering the seed hulls brittle, whereby the quality of the produced cotton seed oil and cotton seed meal will be impaired or quantity lowered; or other equally objectionable methods have been used which are not only more or less expensive but cause injury to the hull or oil and reduce the quality and quantity of the oil and meal obtained.

Where the seed are treated to the direct action of heat flames for the purpose of removing lint and other surface impurities, undue heating, scorching or charring of the seed is liable to occur, because of the impossibility of controlling the action of the flames or the heating temperature produced thereby, so that the value of the seed for the production of oil and meal is impaired.

One object of my invention is to provide an apparatus for electrically burning off the lint and other impurities from the seed and simultaneously heating and softening the seed so as to render the hulls thereof plastic and by (a) passing the seed directly to the hulling machine in this more or less plastic condition avoid its breaking up the hull into fine dust, which dust is almost impossible to separate from the kernels or meats once it gets into the mass, or (b) by passing the warm seed directly into a cold press where the "cold process" is used and thus eliminate the warmers now used in the "cold process" plants.

Another object of the invention is to provide an apparatus for electrically treating cotton seed for rendering the lint and other surface impurities brittle and softening the seed, and also conveying the seed while being heated through a course of travel of such duration and character as to ensure the burning off of substantially all lint and impurities, and the removal of any remaining particles thereof by rubbing action or attrition during the travel of the seed.

Still another object of the invention is to provide an apparatus which is of simple character and whereby the seed may be treated without burning, scorching or otherwise damaging the same, so that oil and seed and hull bran of highest quality may be produced at a comparatively low cost.

The present market value of the fine lint dust which is obtained by the present mechanical process of delinting is about $16.00 per ton. After an average of about 100 pounds per ton of linters is removed from the seed by present mechanical linting processes in use, the cost of delinting the remaining fuzzy lint is in excess of 2½ cents per pound. This excess fuzzy materal must be removed in order to process the low priced hulls into higher valued hull bran where decorticating is done prior to pressing; also should be removed to increase oil yield by avoiding absorption thereof by such fuzzy material where the "cold process" is used and in which process the oil is crushed from the whole seed not decorticated. By this improved, electrical process this fuzzy material is destroyed at a cost of a fractional part of one cent per pound, thus saving the difference to the processer between 2½ cents per pound present cost of production less $16.00 per ton present value less the fractional cent per pound cost of my electrical process.

In the accompanying drawings I have disclosed one type of apparatus in carrying my invention into practical effect, and in said drawings:

Figure 1 is a sectional perspective view of my improved seed delinting and heating apparatus.

Figure 2 is a vertical transverse section through a slightly modified delinter embodying my invention.

Figure 3 is a diagrammatic view showing the electric circuit.

Figure 4 is a side elevation of the apparatus shown in Figure 2.

The apparatus disclosed comprises a casing 1 communicating at its top with a feed chamber or hopper 2 receiving the seed from any suitable source and having arranged therein a rotary feeder 3, whereby the seed in regulated amount and quantity may be supplied to the top of the casing 1.

Arranged in the casing 1 is a screen or surface 4 for conducting and guiding the seed through a treatment course of transit, during which the seed, while moving and being tumbled about or agitated to expose all surfaces thereof and to subject the seed to rubbng attrition, are acted upon by an electrically heated element operating to remove the lint and other impurities from the surfaces of the seed and to heat the seed to the desired degree.

The screen or surface 4 preferably comprises a series of superposed perforate plates 5 provided with electric resistances or burning elements 8 and forming inclined planes. At the lower end of each plate 5 is a riser plate 6 and a baffle plate or deflector 7 also equipped with electric resistances 8, which plates 5 and 6 incline in opposite directions from plates 4 or toward opposite ends of the casing, so as to provide a zig-zag surface or course of transit over which the seed travel from the top to the bottom of the casing. The delivery end of each screen plate 5 is suitably spaced from the receiving end of the underlying riser plate 6 to provide a passage 6' for the feed of the seed from one plate against deflector 7 to the next lower plate.

Each screen plate 5 and deflector 7 comprises or includes electrical resistances 8 of any suitable type such as used in cigar lighters, bakers' ovens or other similar electric heaters, in which a high resistance wire or ribbon is employed and heated to an incandescent glow by the action of an electric current. The resistances 8 are preferably arranged transversely of the plate and in alternation with the transverse rows of perforations 5' in the plate. The perforations in the plates 5 are of comparatively small size, sufficiently large to permit the passage of the products of combustion therethrough onto the inclined floor 16, but not sufficiently large to permit the passage of the seed therethrough. Hence the seed will travel continuously over the zig-zag surfaces formed by the inclined plate and deflectors backward and forward from top to bottom of the casing 1, during which they are exposed to the burning action of the heated surface of the electrical resistance. In practice the resistance is made of such character as to produce a red hot element of such temperature as will effect the burning off of lint and other impurities without scorching, charring or otherwise injuring the seed, the temperature being just sufficient to cook or heat the seed to such a degree during their time period of travel as to soften the hull and other fibrous parts of the seed to render the hulls more or less plastic and to open up the oil cells for a free liberation of the oil when the seed are crushed.

The casing 1 is provided at its lower end with an outlet 9 for the discharge of the delinted and heat softened seed. The seed discharging through the outlet 9 may be delivered to a suitable receptacle for future use or the casing may be so arranged as to be disposed immediately above the huller or press for the direct passage of the treated seed thereto. Plates 5 and 6 and deflectors 7 are suitably mounted together on a frame so that it may be reciprocated, as by means of a suitable eccentric mechanism 10, for the purpose of agitating the seed, to cause the travel of the seed by the combined effects of impulse movements and gravity down the zig-zag treatment surface. It will thus be understood that as the seed travel over the inclined plates 5 and 6 of the zig-zag surface and pass against deflector 7 from plate to plate, they will be given a tumbling action, or repeatedly turned over. By this means all surfaces of the seed will be exposed to the burning and heating action of the heat surface, so as to ensure the bringing of all the lint or other foreign material in position to be burned, while at the same time preventing too long exposure of any part of the seeds to the flow of the heat resistance. Hence all lint and other particles will be burned off by the action of the electric flame, or reduced to such a brittle or friable condition that the brittle particles will be removed by the tumbling and rubbing attrition of the traveling seed, ensuring the delivery of thoroughly cleaned seed for use. The seed treated and discharged from the hopper will have been cooked and softened to such a degree as first (1st) to render the hulls suitably plastic, without scorching, charring or other deleterious actions, to prevent breaking up of the said hulls into flying particles in a huller, where same is used, and second (2nd) to expand the oil cells in kernels or meats so as to ensure the liberation of all oil and the leaving of the solid matter in such condition that meal of vaporized quality may be produced therefrom, or, if the seed are for storage and not immediate milling the apparatus can be operated at a higher speed and the seed hastened along so as not to raise materially the temperature of the seed, but at the same time thoroughly removing all linty substances therefrom. In other words, it can be operated solely as a delinter or as a delinter and heater at the will of the operator.

In order to ensure proper removal of the ashes of combustion of the burned lint or other foreign particles burned or dislodged from the surface of the seed, a flexible gathering flue 11 is preferably provided at one side of the casing having and connected with an exhaust fan 14 arranged to effect the production of a slight vacuum in the casing, whereby ashes and other liberated particles will be drawn into the flue and discharged from the casing. By this means the seed and surfaces of the heater will be physically cleaned and all particles of ashes and foreign material removed from the casing in a simple, reliable and effective manner.

The casing may be provided with a hinged top, and at its bottom and at other points, if desired, with a door or doors 14' so that access may be obtained thereto for application, removal, cleaning or repairs of any of the internal parts.

It will be seen from the foregoing that my invention provides an apparatus whereby cotton seed may be simultaneously delinted and softened, while moving through a prescribed course of travel, by the action of electrical heating means which will ensure the cleanly removal of all lint and other particles from the seed and the heating and softening of the seed to the exact degree desired. By this means the objections to the use of chemical and flame delinters and heaters of the character heretofore employed may be avoided and the operation conducted in a more reliable, cleanly, certain and efficient manner, and with much less apparatus and at a greatly reduced cost. My invention not only enables the burning off of the lint and heat softening of the seed without scorching, charring or other similar injury, but also without exposure to gases and products of combustion involved in the use of flames from burning fuel. By employing electrical heating means complex equipment for the use of gas, coal or other fuel is avoided, and fire hazards reduced to the minimum. Also by the use of electric heat the amount of heat applied may be controlled to an exact degree, by regulating the flow of the current, which is impossible in the use of other heating means.

In practice the electrical heater may be arranged in any suitable circuit, such as that shown at 15 in Fig. 3, connected with a suitable source of electricity and containing a cut-out switch 16' and a reset and controlling switch 17, whereby the flow of current to the electrical resistance may be regulated as required.

In the construction shown in Fig. 2 the casing is vertical and the perforated metal plates 5b are alternately inclined in opposite directions or take a zigzag course and the resistances 8' are arranged below the plates and a discharge flue for outlet of the lint dust and products of combustion is provided at one side of the casing and connects with the spaces beneath the plates by passages 12.

While the type of apparatus disclosed is preferred, it will of course, be understood that changes in the form, construction, proportions and arrangement of parts may be made within the scope of the appended claims, without departing from the spirit or sacrificing any of the advantages of the invention.

There are two methods in use for extraction of oil from cotton seed.

1st. The decorticating method, in which the hull is removed from the kernel or meat and then the oil pressed from such meats or kernels. In this method it is highly desirable that complete separation of meats be made from the hulls and lint. The removing of the fuzzy lint substance remaining on the seed, after the usual delinting process, is now generally done by heavy machinery in an expensive mechanical process. After the linty substance has been mechanically removed the seed is put through a grinding machine called huller; the high velocity of the knives traveling in this huller whips into dust much of the dry, brittle hull, and this dust is exceedingly difficult to separate from the mass.

Now, in factories using this decorticating method my electrical invention will remove in a simple, efficient manner all fine lint or fuzzy substance from the whole seed and properly warm the hull of the seed so that same will be rendered in a way pliant or plastic and when brought into contact with the rapidly traveling huller knives, will not tend to break up into dust and fine particles. In mills using the decorticating method it is profitable to be able to produce from the hull a relatively high priced product known as "hull bran", and this can be produced only from hull entirely free from this fuzzy linty material and my electrical invention does this freeing in a highly efficient and simple manner.

2nd. The second method of extracting oil from cotton seed is what is known as the "cold press process" and in this process the whole seed is put under pressure for extracting the oil, i. e., the seed is not hulled or decorticated before pressing. In this method it is highly desirable that all lint or fuzzy material be removed from the seed to prevent absorption of the oil and to render the cake or residue grindable into meal or feed. It is also desirable to warm the seed so as to expand the oil pores or cells and thereby cause the oil to be more easily extracted.

My electrical invention accomplishes both these very desirable purposes and does it in a very inexpensive, simple and thoroughly efficient manner.

The casing 1 may be supported by spring standards 13 resting on the sills 13a, while the feeder 2 is mounted on supports 13b, which also support the eccentric 10, which, in turn, is attracted to the casing by the arm 13c.

What I claim is:

1. In a cotton seed delinter and heater, a casing having inlet and outlet ends, a guide conductor therein comprising a series of inclined guide plates disposed at different levels, the lower end of each guide plate of a series preceding a following guide plate being arranged to overhang the upper end of the succeeding plate, intermediate inclined guide plates between such ends of the first-named plates, each of said plates having rows of spaced electrical heaters and rows of spaced perforations between the heaters, means for introducing seed to be treated at the inlet end of the casing for travel by gravity over said guide plates, whereby in the course of travel of the seed the seed will be tumbled over in its fall from plate to plate and the lint burned therefrom by the electric heaters and the products of combustion discharged through the perforations in the plate and any adhering particles of lint removed by attrition, and means for circulating air through the casing and perforations in the plates for discharging the products of combustion.

2. In a cotton seed delinter and heater, a casing having inlet and outlet ends, a guide conductor therein comprising a series of inclined guide plates disposed at different levels, the lower end of each guide plate of a series preceding a following guide plate being arranged to overhang the upper end of the succeeding plate, intermediate inclined guide plates between such ends of the first-named plates, each of said plates having rows of spaced electrical heaters and rows of spaced perforations between the heaters, means for introducing seed to be treated at the inlet end of the casing for travel by gravity over said guide plates, whereby in the course of travel of the seed the seed will be tumbled over in its fall from plate to plate and the lint burned therefrom by the electric heaters and the products of combustion discharged through the perforations in the plate and any adhering particles of lint removed by attrition, baffle plates or deflectors arranged at an angle in the path of movement of the seed passing from one plate to another for the purpose of guiding the seed against the intervening plates and agitating the seed in its passage, and means for circulating air through the casing and perforations in the plates for discharging the products of combustion.

ARTHUR L. WOOTEN.